US008112651B2

(12) United States Patent
Wang et al.

(10) Patent No.: US 8,112,651 B2
(45) Date of Patent: Feb. 7, 2012

(54) CONSERVING POWER IN A COMPUTER SYSTEM

(75) Inventors: Ren Wang, Portland, OR (US); Tsung-Yuan Charles Tai, Portland, OR (US); Jr-Shian Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 12/238,291

(22) Filed: Sep. 25, 2008

(65) Prior Publication Data
US 2010/0077243 A1    Mar. 25, 2010

(51) Int. Cl.
*G06F 1/00* (2006.01)
*G06F 1/26* (2006.01)

(52) U.S. Cl. ........ 713/323; 713/300; 713/320; 713/324; 710/14

(58) Field of Classification Search .................. 713/300, 713/320, 323, 324
See application file for complete search history.

(56) References Cited

U.S. PATENT DOCUMENTS

| | | | | |
|---|---|---|---|---|
| 5,954,820 | A | * | 9/1999 | Hetzler ........................ 713/323 |
| 7,380,147 | B1 | * | 5/2008 | Sun .............................. 713/323 |
| 7,725,750 | B2 | * | 5/2010 | Ashish et al. ................ 713/323 |
| 2003/0061526 | A1 | | 3/2003 | Hashimoto |
| 2007/0245163 | A1 | | 10/2007 | Lu et al. |
| 2009/0031156 | A1 | * | 1/2009 | Barth ........................... 713/323 |

FOREIGN PATENT DOCUMENTS

WO  WO-2010/036592  4/2010

OTHER PUBLICATIONS

IEEE Transactions on Very Large Scale Integration (VLSI) Systems, vol. 10, No. 2—"Power-Aware Operating Systems for Interactive Systems" by Yung-Hsiang Lu, Luca Benini, and Giovanni De Mecheli; 16 pages, dated Apr. 2002.*

IEEE Transactions on Very Large Scale Integration (VLSI) Systems, vol. 8, No. 3—"A Survey of Design Techniques for System-Level Dynamic Power Management" by Luca Benini, Alessandro Bogliolo, and Giovanni De Mecheli; 18 pages, dated Apr. 2000.*

ACM Transactions on Design Automation of Electronic Systems, vol. 5, No. 2—"A Predictive System Shutdown Method for Energy Saving of Event-Driven Computation"—by Chi-Hong Hwang and Allen C. H. Wu; 16 Pages, Dated Apr. 2000.*

(Continued)

*Primary Examiner* — Brian Misiura
(74) *Attorney, Agent, or Firm* — Blakely, Sokoloff, Taylor & Zafman LLP

(57) ABSTRACT

A power management unit (PMU) may determine an optimal power saving state using a break-even period of a power saving state and an expected idle duration based on a first policy. The PMU may determine the optimal power saving state using a first break even period and actual idle duration based on a second policy. The break-even period may equal a minimum time a computer system should remain in a power saving state to compensate for the power consumed by the system to enter and exit that power saving state. The expected idle time duration is determined as an average of idle duration and a recent sample of idle duration. The actual idle duration is the difference of a first and second time point that represents entry and exit points to and from the power saving state. The PMU may transition the system to the optimal power saving state.

8 Claims, 3 Drawing Sheets

OTHER PUBLICATIONS

International Search Report for PCT Patent Application No. PCT/US2009/057625 mailed May 10, 2010, 3 pgs.

Lu, Yung-Hsiang et al. "Comparing System-Level Power Management Policies," IEEE Design & Test of Computers: Mar.-Apr. 2001, 10 pgs.

Macht, Holger, "GreenIT: Power Consumption and Optimization PCs," Jul. 17, 2008, 18 pages.

International Preliminary Report on Patentability for International Patent Application No. PCT/US2009/057625, Mailed Apr. 7, 2011, 5 pages.

* cited by examiner

CONSERVING POWER IN A COMPUTER SYSTEM

BACKGROUND

A computer system may represent a networked device of a computer network and the network device typically consumes power. A networked device may be powered on to maintain the network presence even while the network activity is low. A networked device may enter power saving states to conserve power. The power management techniques may help in determining a power state into which one or more components of the computer system is to be placed.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique for conserving power in a computer system or computer system component. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, or acoustical signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
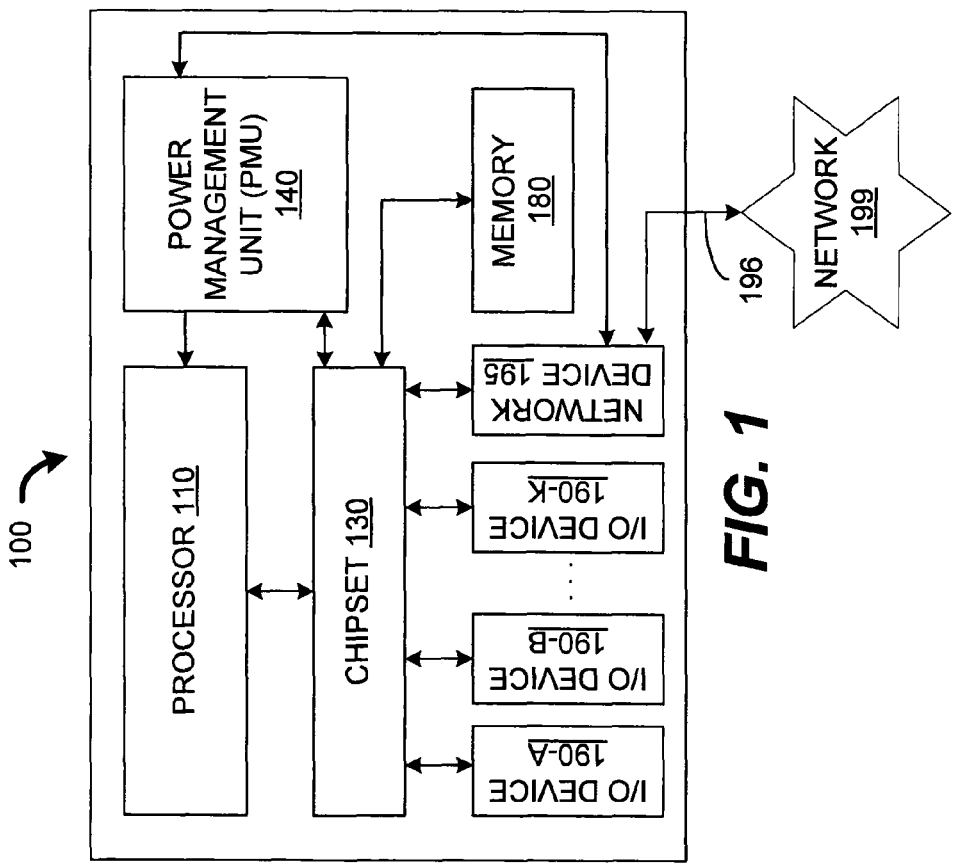
FIG. 1 illustrates a computer system 100, including a power management technique according to one embodiment.

A computer system 100, which may support features to conserve power in accordance with an embodiment, is illustrated in FIG. 1. In one embodiment, the computer system 100 may represent an end system in a computer network or a platform, or any device which support one or more power saving states. In one embodiment, the computer system 100 may comprise a processor 110, a chipset 130, a power management unit 140, a memory 180, I/O devices 190-A to 190-K, and a network device 195.

The processor 110 may manage various resources and processes within the computer system 100 and may execute software instructions as well. The processor 110 may interface with the chipset 130 to transfer data to the memory 180, the I/O devices 190, and the network device 195.

The chipset 130 may comprise one or more integrated circuits or chips that may couple the processor 110, the memory 180, and the I/O devices 190 and the network device 195. In one embodiment, the chipset 130 may comprise controller hubs such as a memory controller hub and an I/O controller hub to, respectively, couple with the memory 180 and the I/O devices 190.

The memory 180 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computing system 100.

The network device 195 may transfer the network data units between the computer system 100 and the network 199. In one embodiment, the network device 195 may measure the network activity over the link 196 coupling the network device 195 and the network 199. In one embodiment, the network device 195 may provide one or more activity values such as idle time values to the PMU 140. In one embodiment, the activity values may represent the network activity measured over the link 196. In one embodiment, the network device 195 may generate the activity values at intervals of time. In other embodiment, the activity values may represent an overall network activity level of the computer system 100.

The power management unit 140 may determine an optimal power saving state using a power policy that may adapt to a dynamic workload or the network activity. In one embodiment, the PMU 140 may use the activity value to determine the optimal power saving state into which the components of the computer system 100 may be transitioned. In one embodiment, the PMU 140 may cause the components of the computer system 100 to move from one power saving state to the other based on the activity value. Also, the PMU 140 may allow the components to stay in a previous power saving state if the optimal power saving state does not change. In one embodiment, the PMU 140 may determine the optimal power saving state based on the dynamic conditions of the network activity.

In one embodiment, the computer system 100 may support several power saving states 'Si' (i=0, 1, 2, 3 . . . n). In one embodiment, the computer system 100 may support promotion of the computer system components from a lower power saving state (e.g., S0) to a higher power saving state (e.g., S5) based on the level of network activity. Such an approach may improve opportunities for conserving power in the computer system 100.

Figure 2:
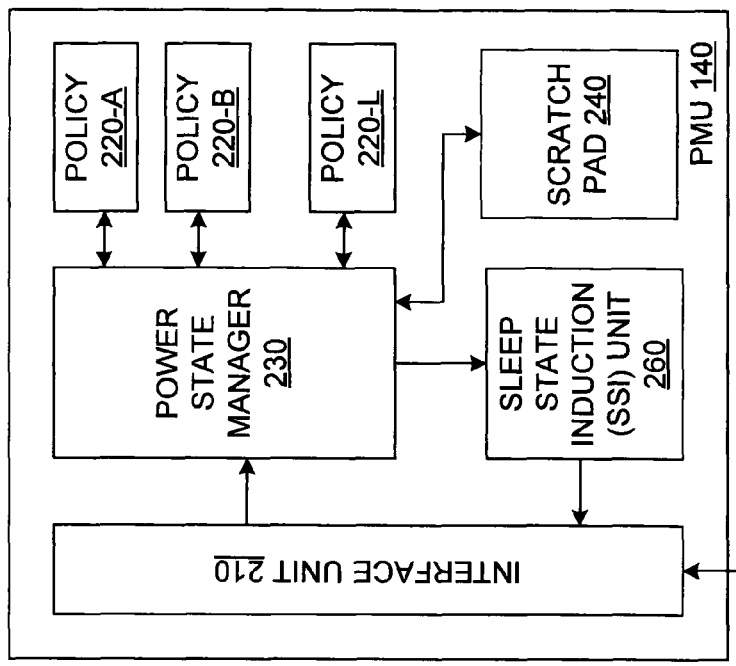
FIG. 2 illustrates a power management unit (PMU), which may conserve power consumed by the computer system 100.

An embodiment of a power management unit (PMU) 140, which may conserve power in the computer system 100, is illustrated in FIG. 2. In one embodiment, the power management unit 140 may comprise an interface unit 210, policy blocks 220, a power state manager 230, a scratch pad 240, and a sleep state induction (SSI) unit 260.

In one embodiment, the interface unit 210 may receive data values such as the activity values and send the values to the power state manager 230. In one embodiment, the interface unit 210 may receive control signals from the sleep state induction unit 260 and send the control signals to the components of the computer system 100.

In one embodiment, the policy 220-A to 220-L may represent power management policies, which may be used by the power state manager 230 to determine the optimal power saving state. In one embodiment, the power management policies 220 may use an exponentially-weighted moving average filter, or an adaptively adjusting sleep state policy, or any other such similar policy.

In one embodiment, the scratch pad 240 may comprise a memory, which may be used to store the activity values received over the interface unit 210. In one embodiment, the scratch pad 240 may also store other values such as the power consumed by components of the computer system 100 in each power saving state, and other such similar values.

In one embodiment, the power state manager 230 may determine an optimal power saving state into which the components of the computer system 100 are to be transitioned. In one embodiment, the power state manager 230 may determine the optimal power saving state as a high power saving state if the network activity is lower and the idle periods are longer than a first set of reference values. In one embodiment, the power state manager 230 may determine the optimal power saving state as a low power saving state if the network activity is higher and the idle periods are shorter than a second set of reference values. In one embodiment, the power state manager 230 may also determine that the optimal power saving state as one of intermediate power saving states between the high and low power saving states based on the level of network activity and duration of the idle periods.

In one embodiment, the power state manager 230, while determining an optimal power saving state may consider attributes of each power saving state Si. In one embodiment, each power saving state Si may be described by attributes such as 1) entry latency Li(enter) and resume latency Li(exit); 2) power consumed (Pi), while the computer system 100 in a power saving state Si; and 3) power consumed (PRi) during the resuming phase of the computer system 100 from a high power saving state to a low power saving state.

In one embodiment, the components of the computer system 100 residing in a high power saving state may consume less power compared to the computer system 100 residing in a low power saving state. However, the computer system 100 or the components that reside in high power saving state may consume more time to resume (resume latency) to a normal ON state as compared to the components that may be in lower power saving states. In one embodiment, the power utilized by a component that may be in high power saving state to resume may also be high. Thus, it may not always be desirable to transition the components of the computer system 100 to a high power saving state. In one embodiment, it may not be desirable to transition the computer system 100 into high power saving states if the computer system 100 is expected to wake-up from a sleep state within a short duration.

In one embodiment, the power state manager 230 may use the activity values and one of the policy 220-A to 220-L to determine the optimal power saving state. In one embodiment, the power state manager 230 may send a state value that may represent the optimal power saving state to the sleep state induction (SSI) unit 260.

In one embodiment, the sleep state induction (SSI) unit 260 may generate control signals in response to receiving the state value. In one embodiment, the control signals may cause the components of the computer system 100 to transition into a power saving state as determined by the power state manager 230. In one embodiment, the control signals may power off some or all of the components of the computer system 100. In other embodiment, the control signals may gate the clock supplied to the components of the computer system 100.

Figure 3:
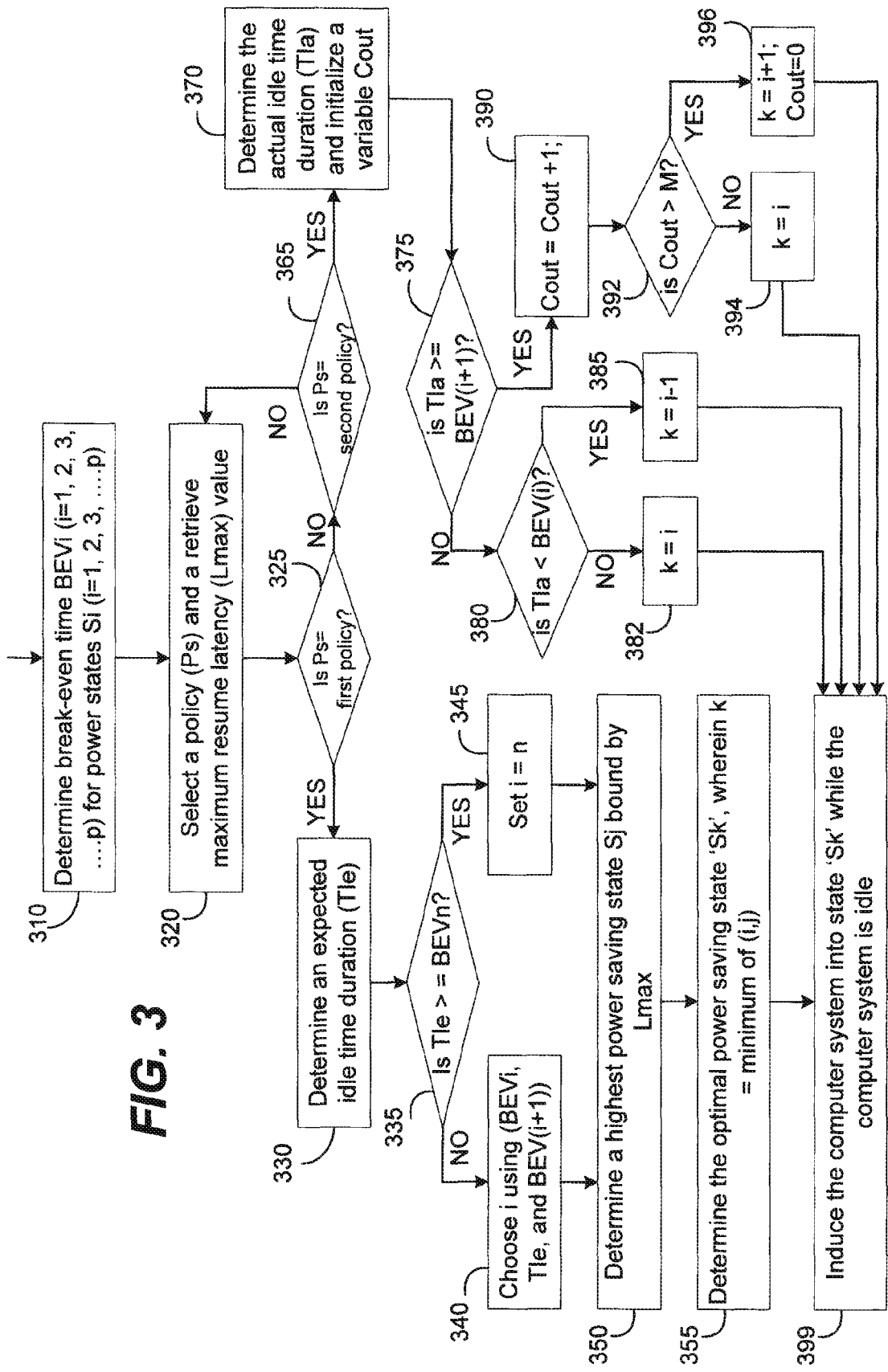
FIG. 3 is a flow diagram illustrating a power consumption technique that may be performed by the power management unit according to one embodiment.

An embodiment of a power management technique performed by the PMU 140 in accordance to an embodiment is illustrated in FIG. 3.

Figure 4:
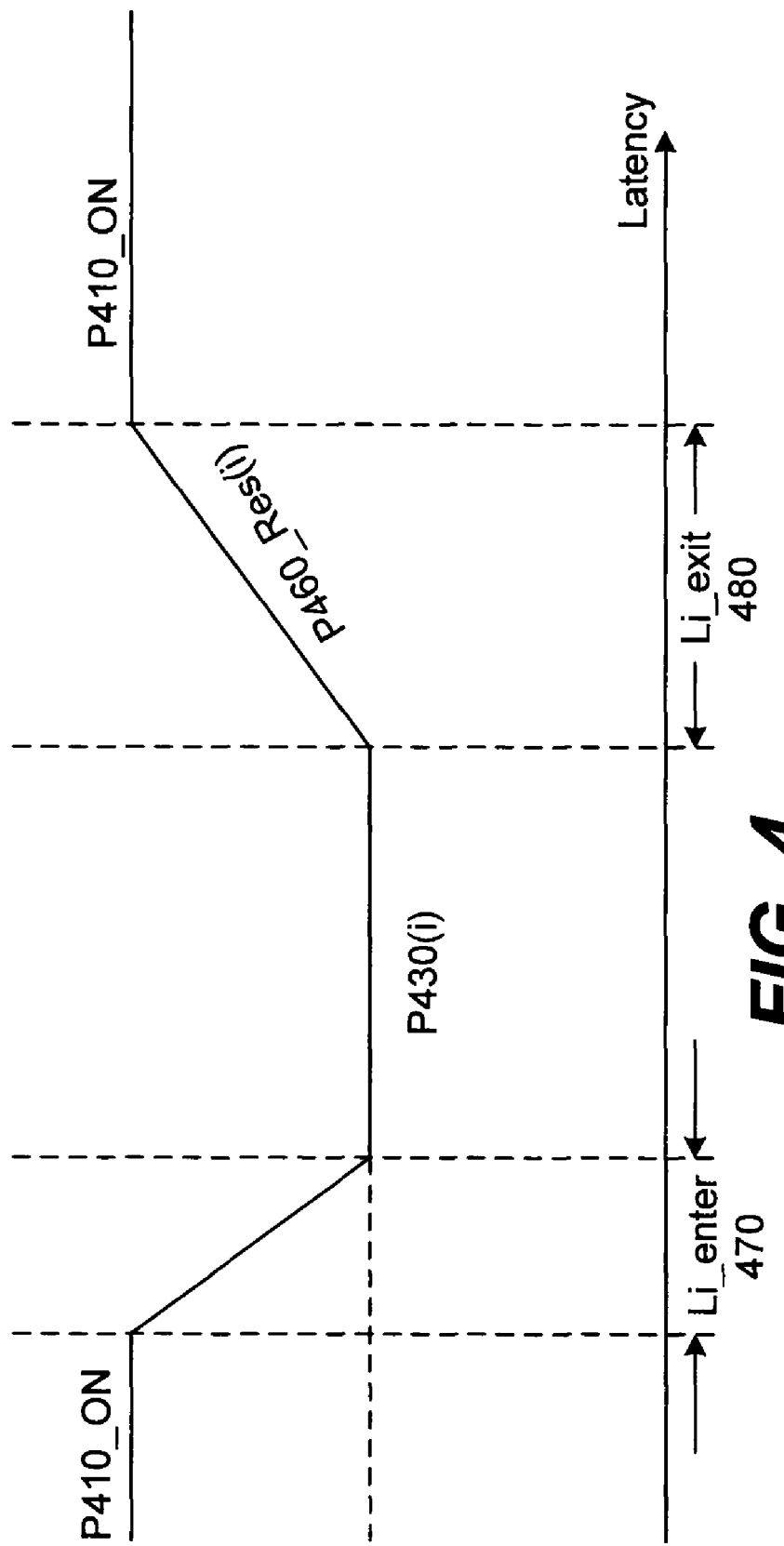
FIG. 4 illustrates a chart depicting power states and latencies associated with transitions from one power state to the other in accordance with at least one embodiment of the invention.

In block 310, the power state manager 230 may determine break-even periods (BEVi) for the power saving states Si. In one embodiment, the break-even periods for a power saving state Si may equal the minimum time the computer system 100 may need to remain in the power saving state Si to compensate for the power consumed by the computer system 100 to enter and exit the power saving state Si. In one embodiment, the power state manager 230 may determine the BEVi for a power saving state Si using the Equation (1) below.

$$BEVi = Li(\text{enter}) + Li(\text{exit}) \times (PRi - Pon)/(Pon - Pi) \quad \text{Equation (1)}$$

wherein, Li(enter) may equal the time required for the computer system 100 to enter a power saving state Si. In one embodiment, Li(enter)_470 of FIG. 4 represents the entry latency for the computer system 100 to enter the power saving state Si from a power ON state; Li(exit) may equal the time required for the computer system 100 to exit the power saving state Si and come back to power ON state. In one embodiment, Li(exit)_480 of FIG. 4 represents the exit latency or resume time for the computer system 100 to resume form the power saving state Si to a power ON state; Pi is the power consumed by the computer system 100 in the power saving state 'Si' and P430(*i*) of FIG. 4 represents the power consumed in the power saving state Si; PRi is the power consumed by the computer system 100 during the resume phase from the power saving state Si to power ON state; and Pon is the power consumed while the component is operating in a steady ON state.

In block 320, the power state manager 230 may select one of the policies (Ps) 220-A to 220-L and may retrieve a maximum allowable resume latency value (Lmax) stored in the scratch pad 240. In one embodiment, the power state manager 230 may select one of the policies 220-A to 220-L based on an input provided by a user. In other embodiment, the power state manager 230 may select one of the policies 220-A to 220-L based on history accounting, which may indicate one of the policy 220 that performed best in a given previous period of time. In one other embodiment, the power state manager 230 may select a policy, for example, 220-A using a default value and may switch to other policy, for example, 220-D if the policy 220-A results in errors beyond a pre-set value.

In one embodiment, Lmax may represent the maximum allowable resume latency that the computer system 100 may tolerate. In one embodiment, Lmax may be determined based on factors such as quality of service (QoS) requirement or buffering capabilities. For example, the buffering capability of an upstream system, which may receive data units, may facilitate a guaranteed time Lmax during which the upstream buffers may store data units such that the downstream system is able to wake-up in time to receive the data units.

In block 325, the power state manager 230 may check the policy selected and may continue to determine the optimal power saving state using the selected policy. In one embodiment, the power state manager 230 may use one of the two policies 220-A and 220-B. However, the PMU 140 may support more than two policies and the power state 230 may select a policy from any of the available policies 220. In one embodiment, the power state manager 230 may cause control to pass to block 330 if the selected policy equals a first policy (e.g., 220-A) and to block 365 if the selected policy is not equal to the first policy.

In block 330, the power state manager 230 may determine an expected idle duration (TIe). In one embodiment, the first policy may use Exponentially-Weighted Moving Average (EWMA) filter to determine the expected duration of idle periods (TIe). In one embodiment, the duration of idle periods may represent the time slots that the computer system 100 may remain idle between activity periods. In one embodiment, the exponentially-weighted moving average filter may determine a running average of the length of the durations of idle periods. In one embodiment, the power state manager 230 may determine the expected duration of idle periods (TIe) using the Equation (2) shown below.

$$TIe = \alpha \times TIe + (1-\alpha) \times NewTI \quad \text{Equation (2)}$$

wherein TIe is the expected idle duration determined based on the traffic pattern; NewTI is the most recent sample of idle duration; and '$\alpha$' is a weight, which may be adjusted based on the speed desired for tracking changes and 'x' is a multiplication operator.

In one embodiment, the NewTI may represent an immediate past idle interval and may approximately equal an idle interval between occurrences of a pair of network activity events. In one embodiment, the value of '$\alpha$' may equal 0.9 and if the value of '$\alpha$' is higher, the EWMA filter may track the changes faster.

In block 335, the power state manager 230 may compare the value of TIe and BEVn and control passes to block 340 if TIe is less than BEVn and to block 345 if TIe is equal to or greater than BEVn. In one embodiment, BEVn may represent a break-even period for a power saving state 'n'.

In block 340, the power state manager 230 may select a value for 'i' using BEVi and TIe. In one embodiment, the value of 'i' may be selected such that BEVi<=TIe<BEV(i+1). In one embodiment, a first candidate 'i' may be bounded between BEVi and BEV(i+1) if TIe is less than or equal to BEVi. In block 345, the power state manager 230 may set 'i'='n'. In one embodiment, the first candidate 'i' may equal 'n', if TIe is greater than or equal to BEVi.

In block 350, the power state manager 230 may determine a second candidate 'j' for the optimal power saving state as a highest power saving state 'Sj' bound by Lmax. In one embodiment, if the resume latency period is greater than Lmax, the QoS parameters may be violated or the computer system 100 may lose data as the computer system 100 may not wake-up in time.

In block 355, the power state manager 230 may determine the optimal power saving state 'Sk', wherein 'k' is minimum of the (first candidate 'i' and second candidate 'j'). In one embodiment, from the performance perspective, the maximum allowable latency may restrict the computer system 100 to transition into a power saving state, for example S(j+1), which is beyond Sj. In one embodiment, transitioning beyond power saving state Sj may violate the QoS or other such service parameters. Also, from the power saving perspective, Si is the highest power saving state into which the computer system 100 may transition without causing power penalty as transitioning into S(i+1) power saving state may cause power penalty.

In block 365, the power state manager 230 may check if the selected policy equals a second policy (e.g., 220-B) and control passes to block 370 if the selected policy equals the second policy. In one embodiment, the logic used in blocks 370 to 396 may represent the adaptive adjustment policy for determining the optimal power state policy.

In block 370, the power state manager 230 may determine the actual idle duration (TIa) and also initialize a variable Cout. In one embodiment, the power state manager 230 may keep track of the transitions of the computer system 100 into and out of the power savings state. In one embodiment, the power state manager 230 may determine the actual idle duration (TIa) by recording a first time point at which the computer system 100 transitioned to a power saving state and a second time point at which the computer system 100 woke-up from the power saving state. In one embodiment, the actual idle (TIa) may equal difference of second time point and the first time point. In one embodiment, the power state manager 230 may use the immediately available previous time points to determine the actual idle (TIa).

In block 375, the power state manager 230 may check if TIa is greater than or equal to BEV(i+1) and control passes to block 380 if TIa is less than BEV(i+1) and to block 390 if TIa is greater than or equal to BEV(i+1).

In block 380, the power state manager 230 may check if TIa is less than BEV(i) and control passes to block 382 if TIa is not less than BEV(i) and to block 385 if TIa is greater than or equal to BEV(i).

In block 382, the power state manager 230 may assign k=i and in block 385, the power state manager 230 may assign k=i−1 and control passes to block 399.

In block 390, the power state manager 230 may increment Cout. In one embodiment, the power state manager 230 may determine that the computer system 100 may transition to a higher power saving state if TIa is larger than BEV(i+1). In one embodiment, a longer actual idle TIa may justify the transition to the higher power saving state. In one embodiment, the power state manager 230 may track the actual idle TIa before determining to transition to the higher power saving state. In one embodiment, the power state manager 230 may track the duration in which the computer system 100 remained in the power saving state by incrementing the variable Cout.

In block 392, the power state manager 230 may check if Cout is greater than a value M and control passes to block 394 if Cout is less than M and to block 396 if Cout is greater than M.

In block 394, the power saving state 230 may assign k=i and in block 396, the power saving state 230 may assign k=i+1 and reinitialize Cout.

In block 399, the sleep state induction (SSI) unit 260 may generate control signals based on the optimal power saving state (Sk) information received from the power state manager 230. In one embodiment, the SSI unit 260 may generate control signals such as power gating and clock gating signals to transition the components of the computer system 100 to a power saving state that represents the optimal power saving state determined by the power state manager 230.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method for conserving power comprising:
    determining break-even periods associated with a plurality of power saving states, wherein the break-even period is a minimum time a computer system is to remain in a power saving state to compensate for a power consumed by the computer system to enter and exit the power saving state,
    determining the power saving state for the computer system to enter, wherein the power saving state is determined using a break-even period associated with the power saving state and an expected idle duration, if a first saving policy is selected, wherein the expected idle duration is determined using a running average of idle durations over a time period prior to a recent sample and the recent sample, wherein the expected idle duration represents network activity,
    determining the power saving state for the computer system to enter, wherein the power saving state is determined using the break even period and an actual idle duration, if a second saving policy is selected, wherein the actual idle duration is the difference between a first time point and a second time point, wherein the first time point represents a point at which the computer system transitioned to a low state and a second time point represents a point at which the computer system woke-up from the low power state, and
    transitioning the computer system to the power saving state, wherein the power saving state is a minimum of a first candidate and a second candidate, wherein the first candidate for the power saving state is equal to a first power saving state if the expected idle duration is more than the break-even period and a second candidate for the power saving state is equal to a highest power saving state within maximum allowable resume latency, wherein the power saving state is equal to the first power saving state if the actual idle duration is greater than a next break-even period and less than a reference duration value and to a next higher power saving state if the actual idle duration is greater than the next break-even period and greater than the reference duration value.

2. The method of claim 1, wherein the power saving state is equal to the first power saving state if the actual idle duration is between the break-even period and the next break-even period and the power saving state is equal to a next lower power saving state if the actual idle duration is less than the break-even period and the next the break-even period.

3. An apparatus to conserve power comprising:
    an interface unit,
    a power state manager coupled to the interface unit, wherein the power state manager is to,
        determine break-even periods associated with a plurality of power saving states, wherein the break-even period is a minimum time a computer system is to remain in a power saving state to compensate for a power consumed by the computer system to enter and exit the power saving state,
        determine the power saving state for the computer system to enter, wherein the power saving state is determined using a break-even period associated with the power saving state and an expected idle duration, if a first saving policy is selected, wherein the expected idle duration is determined using a running average of idle durations over a time period prior to a recent sample and the recent sample, wherein the expected idle duration represents network activity,
        determine the power saving state for the computer system to enter, wherein the power saving state is determined using the break even period and an actual idle duration, if a second saving policy is selected, wherein the actual idle duration is the difference between a first time point and a second time point, wherein the first time point represents a point at which the computer system transitioned to a low state and a second time point represents a point at which the computer system woke-up from the low power state, and
    a sleep state induction unit coupled to the power state manager, wherein the sleep state induction unit is to transition the computer system to the power saving state, wherein the power saving state is a minimum of a first candidate and a second candidate, wherein the first candidate for the power saving state is equal to a first power saving state if the expected idle duration is more than the break-even period and a second candidate for the power saving state is equal to a highest power saving state within maximum allowable resume latency, wherein the power saving state is equal to the first power saving state if the actual idle duration is greater than a next break-even period and less than a reference duration value and to a next higher power saving state if the actual idle duration is greater than the next break-even period and greater than the reference duration value.

4. The apparatus of claim 3, wherein the power saving state is equal to the first power saving state if the actual idle duration is between the break-even period and the next break-even period and the power saving state is equal to a next lower power saving state if the actual idle duration is less than the break-even period and the next the break-even period.

5. A machine-readable storage medium comprising a plurality of instructions that in response to being executed result in a processor:
    determining break-even periods associated with a plurality of power saving states, wherein the break-even period is a minimum time a computer system is to remain in a power saving state to compensate for a power consumed by the computer system to enter and exit the power saving state,
    determining the power saving state for the computer system to enter, wherein the power saving state is determined using a break-even period associated with the power saving state and an expected idle duration, if a first saving policy is selected, wherein the expected idle duration is determined using a running average of idle durations over a time period prior to a recent sample and the recent sample, wherein the expected idle duration represents network activity, determining the power saving state for the computer system to enter, wherein the power saving state is determined using the break even period and an actual idle duration, if a second saving policy is selected, wherein the actual idle duration is the difference between a first time point and a second time point, wherein the first time point represents a point at which the computer system transitioned to a low state and a second time point represents a point at which the computer system woke-up from the low power state, and transitioning the computer system to the power saving state, wherein the power saving state is a minimum of a first candidate and a second candidate, wherein the first candidate for the power saving state is equal to a first power saving state if the expected idle duration is more than the break-even period and a second candidate for the power saving state is equal to a highest power saving state within maximum allowable resume latency, wherein the power saving state is equal to the first power saving state if the actual idle duration is greater than a next break-even period and less than a reference duration value and to a next higher power saving state if the actual idle duration is greater than the next break-even period and greater than the reference duration value.

6. The machine-readable storage medium of claim 5, wherein the power saving state is equal to the first power saving state if the actual idle duration is between the break-even period and next the break-even period and the power saving state is equal to a next lower power saving state if the actual idle duration is less than the break-even period and the next the break-even period.

7. A system comprising:
a processor,
a chipset coupled to the processor,
a memory coupled to the chipset,
a plurality of input-output devices coupled to the chipset, and
a power management unit coupled to the processor, the chipset, and the input-output devices, wherein the power management unit is to,
determine break-even periods associated with a plurality of power saving states, wherein the break-even period is a minimum time a computer system is to remain in a power saving state to compensate for a power consumed by the computer system to enter and exit the power saving state, determine a power saving state for a computer system to enter, wherein the power saving state is determined using a break-even period associated with the power saving state and an expected idle duration, if a first saving policy is selected, wherein the expected idle duration is determined using a running average of idle durations over a time period prior to a recent sample and the recent sample, wherein the expected idle duration represents network activity, determine the power saving state for the computer system to enter, wherein the power saving state is determined using the break even period and an actual idle duration, if a second saving policy is selected, wherein the actual idle duration is the difference between a first time point and a second time point, wherein the first time point represents a point at which the computer system transitioned to a low state and a second time point represents a point at which the computer system woke-up from the low power state, and transition the computer system to the power saving state, wherein the power saving state is a minimum of a first candidate and a second candidate, wherein the first candidate for the power saving state is equal to a first power saving state if the expected idle duration is more than the break-even period and a second candidate for the power saving state is equal to a highest power saving state within maximum allowable resume latency, wherein the power saving state is equal to the first power saving state if the actual idle duration is greater than a next break-even period and less than a reference duration value and to a next higher power saving state if the actual idle duration is greater than the next break-even period and greater than the reference duration value.

8. The system of claim 7, wherein the power saving state is equal to the first power saving state if the actual idle duration is between the break-even period and the next the break-even period and the power saving state is equal to a next lower power saving state if the actual idle duration is less than the break-even period and the next the break-even period.

* * * * *

UNITED STATES PATENT AND TRADEMARK OFFICE
CERTIFICATE OF CORRECTION

PATENT NO.        : 8,112,651 B2
APPLICATION NO.   : 12/238291
DATED             : February 7, 2012
INVENTOR(S)       : Wang et al.

It is certified that error appears in the above-identified patent and that said Letters Patent is hereby corrected as shown below:

In the Claims

In column 10, at line 40, claim 8, delete, "next the break-even" and insert --next break-even--.

Signed and Sealed this
Fourth Day of March, 2014

Michelle K. Lee
*Deputy Director of the United States Patent and Trademark Office*